(12) United States Patent
Narayanaswamy et al.

(10) Patent No.: US 6,224,925 B1
(45) Date of Patent: *May 1, 2001

(54) SHELF STABLE BROWNIE BATTER ARTICLE AND METHOD OF PREPARATION

(75) Inventors: Venkatachalam Narayanaswamy, Maple Grove; Linda R Kreisman, St. Paul; James E Langler, White Bear Lake; David W Tobelmann, Plymouth, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/427,994

(22) Filed: Oct. 27, 1999

Related U.S. Application Data

(63) Continuation-in-part of application No. 09/322,208, filed on May 28, 1999.

(51) Int. Cl.$^7$ .............................. A21D 4/00; A21D 13/00; A21D 10/04
(52) U.S. Cl. ...................... 426/128; 426/392; 426/399; 426/552; 426/558; 426/561; 426/410
(58) Field of Search .................................. 426/128, 391, 426/392, 399, 552, 558, 561, 410

(56) References Cited

U.S. PATENT DOCUMENTS

| | | |
|---|---|---|
| 2,982,662 | 5/1961 | Cochran . |
| 3,649,304 | 3/1972 | Fehr, Jr. et al. . |
| 3,862,341 | 1/1975 | Johannes . |
| 4,353,932 | 10/1982 | Bone . |
| 4,774,099 | 9/1988 | Feeney et al. . |
| 4,904,493 | 2/1990 | Petrizzeli . |
| 4,940,595 | 7/1990 | Yasosky et al. . |
| 5,034,241 | 7/1991 | Keyser et al. . |
| 5,106,635 | 4/1992 | McCutchan et al. . |
| 5,178,893 | 1/1993 | Seewi et al. . |
| 5,384,139 | 1/1995 | Vasseneix . |
| 5,409,720 | 4/1995 | Kent et al. . |
| 5,447,739 | 9/1995 | Emanuelson et al. . |
| 5,514,387 | 5/1996 | Zimmerman et al. . |
| 6,013,294 | 1/2000 | Bunke et al. . |
| 6,024,997 | 2/2000 | Blaschke . |
| 6,030,654 | 2/2000 | Thomas et al. . |
| 6,039,994 | 3/2000 | LeFlecher et al. . |

FOREIGN PATENT DOCUMENTS

| | | |
|---|---|---|
| 0 868 850 A1 | 10/1998 | (EP) . |
| WO 99/04640 | 2/1999 | (WO) . |

*Primary Examiner*—Nina Bhat
(74) *Attorney, Agent, or Firm*—John A. O'Toole; Douglas J. Taylor; Janal M. Kalis

(57) ABSTRACT

A shelf stable ready-to-bake batter article for brownies comprises an unpressurized gas impermeable container, low water activity high ratio brownie batter disposed within and partially filling the container and an unpressurized, inert low oxygen gas in the headspace. The ratio of sugar to flour in the batter ranges from about 1.5:1 to 3.5:1. The batter has a water activity of less than 0.85.

36 Claims, No Drawings

SHELF STABLE BROWNIE BATTER ARTICLE AND METHOD OF PREPARATION

CROSS REFERENCE TO RELATED APPLICATION

The present application is a continuation-in-part application to U.S. Ser. No. 09/322,208 (filed May 28, 1999) entitled "Shelf Stable Brownie Batter Article and Method of Preparation."

FIELD OF THE INVENTION

The present invention relates to packaged food articles and to their methods of preparation. More particularly, the present invention relates to articles comprising a gas-impermeable container and a flour based batter for brownies that are storage stable at room temperature.

BACKGROUND

Baked goods such as brownies are popular consumer snack food and dessert food items. Traditional brownies are a particularly delectable baked dessert. A wide variety of recipes are currently available for use by consumers to prepare small quantities of brownies from various ingredients.

For greater convenience and shelf stability, dry mixes for brownies have long been available. The consumer mixes the dry mix with liquid ingredients such as water, oil, milk and/or eggs to form a batter. The batter is then immediately poured into a baking pan and baked to form the finished baked goods. Useful developments in the formulation of dry mixes for brownies continue to be made. For example, an improved dry mix for brownies is disclosed in U.S. Ser. No. 08/929,827 filed Sep. 15, 1997 by Palmer et al entitled "Dry Mix for Baked Goods with Gellan Gum and Method of Preparation" (which is incorporated herein by reference). The dry mixes for brownies disclosed therein include gellan gum in addition to other ingredients. The dry mixes not only are useful for preparing, high quality finished baked goods by consumers for home use, but also can be used for the large scale production of finished baked goods suitable for refrigerated sales and distribution. While the formulation for the dry mix is improved, the dry mixes are packaged in a conventional manner in a sealed bag placed in a conventional carton or in pouches without the carton.

While dry mixes for home use are convenient, current trends for consumer package food products favor products of even greater convenience. The present invention provides improved products of greater convenience. The present invention provides articles comprising ready-to-bake batters that are shelf stable at room temperatures.

Refrigerated ready-to-bake batters having relatively short shelf lives are also known. One problem with such products concern is bacterial growth. A second problem resides in providing a leavening system that retains functionality over extended storage. Acidifying the batter desirably extends bacterial stability but the acidity undesirably tends to interact with the leavening system, and leaves an undesirable acid aftertaste. With poor leavening, the finished baked goods exhibit undesirable volume and poor texture. The present invention provides ready-to-bake batters for brownies articles that are shelf stable even at room temperature.

The present articles thus provide the benefits combination of shelf stability of conventional dry mixes with the greater convenience of ready-to-bake batters.

The present invention resides in part in the surprising discovery that $CO_2$ gas producing leavening agent is not an essential ingredient in the present packaged ready-to-bake batters.

Shelf stable batters for layer cake articles are commercially available, for example, in France made as described in EP 868,850 A published Oct. 7, 1998. Such articles comprise an impermeable flexible membrane pouch containing a batter comprising a $CO_2$ gas producing leavening system and an inert gas atmosphere.

SUMMARY OF THE INVENTION

In its product aspect, the present invention resides in ready-to-bake batter articles that provide improved finished baked goods, especially brownies. The articles comprise an unpressurized gas impermeable container, a high pH, low water activity, high sugar to flour ratio brownie batter disposed within the container and an inert low oxygen gas in the headspace not filled by the batter.

The sugar to flour ratio ranges from 1.5:1 to about 3.5:1 The water activity is less than 0.85 the pH ranges from about 6.0 to 8.5. The brownie batter can be aerated with sufficient amounts of $N_2O$ to provide the batter with a density of about 1.00 to 1.2 g/cc. The brownie batter can be aerated with other inert gases such as Nitrogen or Carbon Dioxide. In some cases, no aeration is used. The batter can also be made with or without any chemical leavening system. The headspace inert gas has an oxygen content of less than 4%, preferably less than 2%.

In its process aspect, the present invention is directed to processes for making a ready-to-bake batter article that is shelf stable at room temperature. The process comprising the steps of:

providing an open sealable, gas impermeable container;
dispensing a brownie batter within at least a portion of the container, said brownies comprising:
about 25 to 70% sugar,
About 10 to 40% flour,
about 0 to 5% egg solids,
about 0.1 to 3% salt,
about 0 to 4% emulsifiers,
about 0 to 25% fat, and
about 5 to 25% moisture;
said batter having
a sugar to flour ratio of about 1.5:1 to 3.5:1,
a water activity of less than 0.85,
a pH of about 6 to 8.5; and
can be made with or without any leavening system.
The leavening system either consists of sufficient amounts of $N_2O$ aerated into the batter to a density of about 1.00 to 1.2 g/cc or can be made with no aeration and just chemical leavening or can be made without any gas or chemical leavening; or a combination of above;
filling the headspace portion of the container that is unfilled with the batter with an inert gas having an oxygen content of less then 4%; and
sealing the container to form a shelf stable ready-to-bake brownie article.

DETAILED DESCRIPTION OF THE PREFERRED EMBODIMENT

The present invention relates to packaged ready-to-bake batters for brownies characterized by shelf stability at room temperature and to their methods of preparation. Each of the product components as well as product use and attributes and methods of their preparation and use are described in detail below.

Throughout the specification and claims, percentages are by weight and temperatures in degrees Fahrenheit unless otherwise indicated.

The present articles or products essentially comprise a gas impermeable container; a low water activity-high sugar to flour ratio brownie batter disposed within and partially filling the container; and an unpressurized, inert low oxygen gas in the unfilled headspace.

The batter can have different types of leavening systems. In one embodiment, the batter has no chemical leavening system but comprises gums such as Gellan, while in other embodiments comprises dispersed nitrous oxide to help in leavening. In certain embodiments, the batters comprise a chemical leavening system consisting of encapsulated sodium bicarbonate and leavening acids. Other embodiments can employ any combination of the above such as nitrous oxide and Gellan gum.

The container can be flexible or rigid or semi rigid and of any suitable shape or configuration. For example, suitable for use for the gas impermeable containers are widely available pouches fabricated from flexible laminate materials having low gas permeability. A suitable laminate is a polyester-aluminum-polyester laminate. Also useful are tubs fabricated from plastic, glass or metal. In other variations, the container or portions thereof can serve as a disposable baking container. For example, the container can comprise aluminum or an ovenable plastic baking tray or tub having an overlaying peelable gas impermeable foil membrane. Having the container function as the baking container adds further convenience by eliminating transfer of the batter from the container to the baking utensil.

The articles further essentially include a ready-to-bake batter disposed within the container. The batters essentially comprise sugar, flour, fat, and moisture. Batters and doughs are distinguishable compositions even though each comprises some number of common ingredients.

"Dough" as used herein refers to an intermediate food product that has a gluten based structure. In dough, the gluten forms a continuous dough elastic medium into which other ingredients are embedded. Dough is typically prepared by beating, blending, cutting or kneading and is often stiff enough to cut into various shapes. Doughs generally are used for low sugar to flour ratio products such as breads, biscuits, etc.

In contrast, "Batter" as used herein refers to an intermediate food product that essentially contains flour, water, eggs, and salt and optionally fats and sugar(s) that are a starch batter based composition. In a batter, gluten development is purposefully minimized. Batters are inelastic. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of a container.

Flour

The present batter compositions essentially contain from about 15 to 40% of the batter as flour. Conventionally, flour is standardized to a moisture content of about 14%. However, dried flours with considerable lower moisture contents can also be used. Flour(s) useful herein can be of conventional type and quality including cake flour, bread flour and all-purpose flour. Wheat flours are preferred but other flours conventionally used in the preparation of baked goods can also be employed in full or partial substitution for the wheat flour. Traditional cake flour used for layer cakes has about 8% or less protein by weight of the flour. Pastry flour ordinarily has a protein level of about 10%. Other flours such as bread flour generally have higher protein levels of about 11 to 13% by weight. The preferred protein range for the wheat flour useful in this invention is between about 7 to 10% by weight of the flour. A good general all-purpose flour also can be used. Such all-purpose flour generally comprises a mixture of both hard and soft wheat flours, i.e., both high protein level and low protein level flours. Such flours are useful if the average protein content ranges from about 7 to 10% by weight.

While chlorinated flours can be used herein, preferred for use is unchlorinated flour since chlorinating is an expensive but unnecessary flour-processing step. However, malted flours that are typically used for bread making should be avoided. Unmalted flours selected for use herein should be of high quality and desirably are from wheat with minimal sprout damage.

Sugar

The batter compositions of the present invention also essentially comprises from about 25 to 70% of the batter of a sugar or nutritive carbohydrate sweetener ingredient. Typically, sucrose is used in mixes for baked goods as the sugar ingredient, although up to about 30% of the sugar in the present brownies batters can be supplied by dextrose or by other nutritive carbohydrate sweetening agents, e.g., corn syrup solids. Commercially available milled sugar usually contains up to about 4% starch as an aid to maintaining its free-flowing properties.

Ordinary granulated sugars are satisfactory for use in the dry mix. However powdered sugar or bakers sugar with smaller specific particle size range are preferred because of their property to form flint on top of the baked brownie which is a desirable aesthetic attribute preferred by the consumers. Although different sugars such as sucrose, dextrose, maltose, fructose, lactose, brown and invert sugars, can be used alone or in combination, the preferred sugar is sucrose. Most of the sugars are added dry. However, part of the sugar can be added as maltose syrup or fructose syrup or corn syrup.

Sugar to Flour Ratio

The baker's ratio is the weight ratio of sugar to flour. The baker's ratio is used to provide desired baked good attributes. The baker's ratio of the brownies batters herein can range from about 1.5:1 to 3.5:1, preferably between 1.6:1 to 2.5:1. Maintenance of the sugar to flour ratio within the range is important to providing finished baked goods having the desired eating qualities. The sugar-to-flour ratio is also important to obtaining the desired shelf storage at room temperature benefit provided by the present improved articles.

Fat Component

The present dry mix compositions can also comprise from about 0 to 25% of edible fat or shortening ingredient. A shortening component adds richness to the eating properties of the finished baked goods. Shortenings here refer to all types of fat whether liquid (such as oil) or solid (typical bakery shortenings) or pasty at room temperature.

Preferably, the present batter compositions are fat bearing embodiments that additionally comprise from about 1% to about 25% of the shortening ingredient. Maintenance of shortening concentrations within these limits is important for providing baked goods of acceptable textural quality. In certain batters where $N_2O$ is admixed with the batter, the fat constituent provides a medium for $N_2O$ to dissolve.

In certain embodiments, the batters provide finished baked goods that are low or even free of an added shortening ingredient. In those embodiments, shortening is either not included in the batter or used at levels only required to function as a carrier for the emulsifier ingredient described below, that is from about 0 to 5%, preferably about 0.05–3%.

Conventional shortening materials are suitable for use as the shortening ingredient of the present batters. Such conventional shortening materials are well known in the baked goods art. The conventional shortenings useful herein are fatty glyceridic materials that can be classified on the basis of their physical state at room temperature. Liquid shortenings or oils can be used and provide the advantage of ease of incorporation. Solid shortening can also be used and provides the advantage of desirable mouth feel upon consumption. More commonly, and preferred for use herein are liquid oils such as soybean, canola, palm, corn etc. However the batter also contains low levels of bakery shortening which has some solid fat content at 70 F. The solid fatty glycerides can include fatty mono-glycerides and diglycerides of saturated fatty acids having 16 to 22 carbon atoms. The bakery shortenings can also be partially hydrogenated vegetable oils (mentioned below) with varying degree of solids at room temperature. The liquid shortening can be animal, vegetable or synthetic oil (e.g., sucrose polyesters) which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, canola (rapeseed) oil, babassue oil and the like. Other suitable shortening materials and methods of shortening preparation are described in detail in Bailey, "Industrial Oil and Fat Products," (3rd ed. 1964) which is incorporated herein by reference.

Mixtures of the above oils can also be used herein as can solid fatty materials, such as saturated triglyceride fats. In general, from about 1.5 to 25% of triglycerides that are solid at 70° F. can be added to a liquid oil. The preferred oils are soybean oil hydrogenated to an iodine value (IV) of from about 105 to 115, preferably about 107, corn oil, palm oil, hydrogenated palm oil, lard and tallow oils. Preferably the oils used to prepare the shortening composition will contain only from about 1 to 7% hardstock. Hardstock is a hydrogenated triglyceride having an iodine value of 8 or less. Preferred hardstocks are hydrogenated soybean oil, hydrogenated cottonseed oil, hydrogenated palm oil and hydrogenated lard or tallow.

The present batters further essentially comprise about 0 to 4% of emulsifier(s), preferably about 0.05–3%. Such emulsifiers aid the realization of baked goods with improved grain structure and texture. The emulsifier is also useful to maintain the emulsion integrity of the batter over extended room temperature storage. The shortening provides a convenient carrier for addition of emulsifiers to the batter.

All or a portion of the emulsifier(s) can be admixed with the shortening component. The emulsifier typically comprises from about 1 to 20% of the shortening component.

In some preferred embodiments, all or part of the fat is added as part of an liquid emulsion which constitutes water, oil and/or liquid shortening, all or a portion of the emulsifiers, and minor ingredients. The emulsion is further homogenized to decrease the size of the fat particles and uniformly disperse these fat particles for enhancing stability of this emulsion thereby preventing phase separation of oil and water in the brownie batter. The preferred form of fat component in the liquid emulsion is oil.

Generally useful as the emulsifiers are partially esterified polyhydric compounds having surface-active properties. This class of emulsifiers includes among others mono and diglycerides of fatty acids, organic acid esters of monoglycerides, and fatty acid esters. Mono and diglycerides of fatty acids such as monostearin are commonly used emulsifiers. Preferably they are added as distilled monoglycerides because of their improved purity and better functionality due to decreased interference from diglycerides.

Organic acids such as acetic acid, lactic acid, citric acid, diacetyltartaric acids are used to form esters with monoglycerides to give Acetem, Lactem, Citrem, and Datem respectively. These fall under the category of Organic acid esters of monoglycerides. Some of the subclasses of emulsifiers included in the fatty acid esters category are: Polyglycerol esters of fatty acids (PGE's) wherein the glycerol moiety can be up to 10 or more glycerol molecules and the fatty acids can be palmitic acid, Oleic acid, Stearic acid etc.; Propylene Glycol fatty acid ester (PGME's) with stearic acid such as propylene glycol monostearate (PGMS) etc.; Sorbitan Fatty acid ester which are esters of fatty acids with sorbitol anhydride or sorbitan. Some examples are Sorbitan MonoStearate (Span 60) and sorbitan monooleate (Span 80). Sorbitan esters can be reacted with ethylene oxide to form Polyoxyethylene sorbitan esters such as Polysorbate 60 (polyoxy-20-ethylene sorbitan stearate), polysorbate 80 (polyoxy-20-ethylene sorbitan oleate), polyoxyethylene sorbitan monostearate (Tween 60), and polyoxyethylene sorbitan monooleate (Tween 80), etc.; Sodium Steroyl Lactylate (SSL); Sorbitan Tristearate (STS);Sucrose ester of fatty acids.

Another class of emulsifiers called phospholipids (for e.g. Lecithin) can also be used.

It is preferred to use a combination of emulsifiers mentioned above to give the desirable emulsion stability and prevent phase separation between fat and water in the brownie batter, and the desirable textural attributes in the finished product.

Moisture

The present batters have a total moisture content between 5% and 25%. The total moisture includes water provided with or associated with the various essential and optional ingredients. For example, total moisture includes the moisture associated with flour, starch, cocoa and liquid eggs if used. The total moisture can be easily determined by vacuum oven drying of the batters herein. In some embodiments, no added water is employed to formulate the present batters. Rather, moisture is provided pasteurized liquid eggs and the residual moisture associated with the dry ingredients. In preferred embodiments, dry egg solids are added and the water in brownie batter is added as part of the liquid emulsion or hydrated emulsifiers. Moisture in the batter may also be added in part by the use of sugar syrups such as maltose syrup or corn syrup or fructose syrup or others.

The particular selection of ingredients and concentration are selected to provide batters having a water activity ranging from about 0.65 to 0.85 and for best results about 0.80 to 0.85. Selection of such water activity value is important to achieving a balance between microbial shelf stability and batter handling characteristics.

The present batters are preferably not acidified and thus range in pH from about 6.0 to 8.5. The batters herein are preferably essentially free of conventional leavening acids. The combination of a low oxygen gas in the headspace and a low water activity are sufficient to maintain shelf stability at room temperature.

Leavening Agents

The batters described herein can have different leavening systems such as chemical leavening or gas leavening or no leavening but with hydrocolloids or any combination of the above. These are described in detail below:

$N_2O$

In certain preferred embodiments, nitrous oxide admixed with the batter acts as the leavening agent along with a texturing hydrocolloid such as Gellan gum. The batters may comprise sufficient amounts of $N_2O$ to provide a batter having a density of about 1.0 to 1.2 g/cc. Generally, prior to admixture of the $N_2O$ as described further below, the batters have densities ranging generally between about 1.1 to 1.30 g/cc. Further, aerated batter with densities in the range of 0.8 to 1.0 can provide a texture that is more cake like i.e. a more cake like brownie which is preferred by some consumers. The admixture of $N_2O$ into the batter can function as a leavening in finished baked goods. A portion of the $N_2O$ is dissolved in the batter while a portion is physically entrapped. Both physically trapped gas and chemically dissolved gas provides the desired leavening action during baking.

In some embodiments, the $N_2O$ alone functions to provide the leavening action. In these preferred embodiments, the batters are further defined as being essentially free (i.e., containing less than 0.5 wt. %) of conventional $CO_2$ generating ingredients such as conventional soda constituents.

No Chemical Leavening System

It is an advantage of the present invention that the present batters do not require a conventional acid/soda chemical leavening system. In general, such chemical leavening systems are composed of a baking soda, e.g., sodium, potassium, or ammonium bicarbonate, etc., as a source of carbon dioxide on one hand, and one or more other common baking acids on the other. Maintaining the functionality of a chemical leavening system over time in a batter generally requires careful and expensive encapsulation of the acid, the soda, or both. In preferred embodiments, the present batters additionally comprise about 0.01 to about 0.2% Gellan gum. For best results, the Gellan gum can comprise about 0.015 to 0.12% of the batter.

Gellan gum is a heteropolysaccharide prepared by fermentation of *Pseudomonas elodea* ATCC 31461. Gellan gum is available from Kelco Division of Merck & Co., Inc., San Diego, Calif., under various names, including KELCOGEL, KELCOGEL IF, KELCOGEL PC, and KELCOGEL F. Processes for preparing Gellan gum include those described in U.S. Pat. Nos. 4,326,052 and 4,326,053.

In preferred embodiments, Gellan gum is the sole hydrophilic colloid. In other embodiments, however, the batter can additionally include conventional gum ingredients in addition to the Gellan gum component. In certain preferred embodiments along with Gellan gum, additional leavening agents such as nitrous oxide admixed with the batter can also be used to provide the desired textural attributes.

If desired, the present batters can additionally comprise about 0.02 to 2% of a supplemental gum member selected from the group consisting of guar, xanthan, locust bean, carboxymethyl cellulose and mixtures thereof.

When Gellan gum or other calcium setting hydrophilic colloids are added to the batters, the batter can further beneficially comprise about 10 to 50 ppm soluble calcium. The calcium can be provided by calcium chloride or other calcium salts.

In embodiments where the hydrocolloid acts as the only texturizing agent without any gas admixed with the batter, the density of the batter can be in the range between 1.1 and 1.35 g/cc.

Chemical Leavening

In certain embodiments only a chemical leavening system is used wherein premature reaction between leavening acids and sodium bicarbonate is prevented using soda encapsulated with fat. The fat used for encapsulation melts during baking and reacts with the leavening acid to produce $CO_2$ which leavens the product. In such embodiments wherein only chemical leavening is used as the texturizing agent with and without the presence of hydrocolloid, the density of the batter can be in the range between 1.1–1.35 g/cc. Chemical leavening may be used alone or in combination with other forms of leavening described herein.

In the present article any combination of leavening system can be employed to give the desired texture. The 3 types of leavening systems namely (a) no leavening; (b) nitrous oxide; and (c) chemical leavening; can be used any combination.

The present articles further essentially comprise an initial low oxygen content or inert gas in the head space of the container not occupied by the batter, e.g. $N_2$, or $CO_2$ or $N_2O$ or combination thereof. Noble gases can be used but are not commercially practical.

Other Ingredients

If desired, the batters can further comprise about 0 to 8% of a humectant. Humectant addition is helpful to achieve low water activity level and the microbial shelf stability at room temperature provided by the present articles. The humectant can be any commonly employed humectant ingredient. Preferred humectants are selected from the group consisting of sorbitol, xylitol, mannitol, glycerin, glycerol, propylene glycol and mixtures thereof. Preferred for use herein is a mixture of sorbitol and glycerin.

In highly preferred embodiments, the present articles further comprise an anti-mycotic ingredient such as sodium, potassium sorbate, calcium propionate, or parabens. While not needed to maintain shelf stability addition of such antimycotic ingredients so desired from a food safety standpoint antimycotic in case the physical integrity of the article is comprised and oxygen leaks into the headspace. Preferred in calcium propionate (0–0.2%) or parabens 0 to 0.1%.

While the invention is specifically described in terms of improved brownies, other baked goods within the scope of this invention include bar cookies and chewy granola or snack bars. Brownies as used herein include both chocolate-flavored brownies and vanilla-flavored brownies, also known in the baked goods art as "blondies." When blondies are made, a vanilla flavor is substituted for cocoa in the batter at suitable concentrations.

Batters for chocolate brownies are preferred herein and generally comprise about 2 to 12% cocoa, preferably about 4 to 9%. The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1 to 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the process of this invention and it is intended, therefore, that chocolate, as described above, is to be encompassed by the term "cocoa". When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

Still another useful optional ingredient is starch. Starch addition can be used to influence a variety of finished baked good properties.

The present dry mixes can optionally contain a variety of additional minor ingredients or "conventional additives" suitable for rendering finished baked goods prepared therefrom more organoleptically desirable. Such optional dry mix components include anti-oxidants, flavor/coloring agents, egg solids, salt, coloring agents, flavoring agents, flavor chips, nuts and fruit pieces, or other edible inclusions. Flavor chips include chocolate, mint chocolate, butterscotch, peanut butter chips and mixtures thereof. The flavor chips can be coated with topical film made of hard fat or edible shellac or others to minimize moisture and/or fat migration. If present, such optional components collectively comprise from about 1 to 25% of the batter of the present invention.

Another highly preferred optional ingredient in the present batters is nonfat dry milk solids. Nonfat dry milk solids aid the structuring of the finished baked good. If present, such dry milk solids can comprise from about 0.5 to 2.0% of the present batters.

METHOD OF PREPARATION

The batters of the present invention are prepared by blending the essential and optional components together in such a conventional manner as to produce a well blended batter. In a preferred method of preparation, a preblend of the dry ingredients is made. If employed, shortening is melted to form a liquid or liquid oil is used. A portion of the water is used to prehydrate the gums and a portion to prehydrate the emulsifiers. Thereafter, the liquid ingredients (oil, water, hydrated gums, and hydrated emulsifiers) are combined to form a wet mixture or emulsion. The wet mixture and dry preblend are then combined under anaerobic conditions to form a batter. The batter can, for example, be prepared in a batch or a continuous mixing device with or without a provision to add gas. The batch mixers used can be a stepan or a Tweedy mixer. A continuous mixer can be single or twin screw extruder. However, other types of batch or continuous mixers described in the Handbook of Bread-Making Technology (edited by Charles A. Stear, and published by Elsevier Applied Science, UK) can be used also.

The $N_2O$ can be admixed with the batter in any convenient manner either in the mixers described above or in a separate step in continuous mixer-aerators such as a Goodway mixer or an Oakes Whipper or a Mondomixer aerator (Mondomix B. V., ZH Nederhorst den Berb, Netherlands) or others used in the confection art. A Goodway CM-6 continuous mixer/foamer manufactured by Goodway Sales, Inc., 175 Orville Drive, Bohemia, N.Y. (see http://www.goodwaysales.com/mixers/cm6_10.htm).

Desired quantities of batters are then charged to the container or are otherwise disposed within the container. The batter filled container is then flushed or charged with an inert gas or gas blends to insure low oxygen atmosphere in the unfilled headspace. The containers are then sealed to form the finished ready-to-use or bake container articles. The articles enjoy extended shelf stability at room temperature and do not require refrigerated storage.

The product is packaged to be substantially unpressurized. As a result, the package has an internal pressure of about 700 to 1,000 millibar of pressure.

The packaged ready-to-bake baked goods batter articles herein do not require heat treatment such as pasteurization or refrigeration in order to obtain shelf stability. The products enjoy microbial stability and retain their good baking properties for as long as four to nine months at room temperature storage.

The articles so prepared enjoy extended shelf stability at room temperature and do not require refrigerated storage.

The present batters are conveniently prepared into finished baked goods by simple addition to a suitable baking container or pan and baking to form a finished brownies baked good is charged into a baking container and baked for sufficient times, for example, at 160° to 200° C. (325 to 400° F.) for about 20 to 40 minutes to form a finished brownie baked good.

Baking time depends on the thickness of the batter in the pan, with a longer bake time required for a thicker (higher) batter. Bake times range between about 20 to 45 minutes. For a preferred, fudgy brownie, bake times are between about 20 to 30 minutes. For a more cake-like brownie, a longer bake time is used, generally longer than 27 minutes.

The resultant finished baked goods are characterized by a highly moist but not sticky or tacky texture. The finished baked goods are ready for immediate consumption or can be prepared on a commercial scale for refrigerated distribution.

The packaged ready-to-bake brownies batter articles herein do not require heat treatment such as pasteurization or refrigeration in order to obtain shelf stability. The products enjoy microbial stability and retain their good baking properties for as long as four to nine months at room temperature storage. Also, while the present articles do not require refrigeration, the articles can be cooled and stored at refrigeration temperatures.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A ready-to-bake article for brownies, comprising:

an essentially gas-impermeable container;

a batter disposed within the container, comprising:
sugar, flour, edible fatty triglycerides, moisture, said batter having a sugar to flour ratio of at least 1.5:1 to 3.5:1,
a moisture content of about 5 to 25%,
a water activity of less than 0.85; and
a leavening system consisting of an inert gas disposed within the container and
within the batter, the container having less than 4% residual oxygen.

2. The batter article of claim 1 additionally comprising about 1% to 25% of a fat.

3. The batter article of claim 1 substantially free of a chemical leavening system.

4. The batter article of claim 1 aerated with sufficient amounts of $N_2O$ to provide the batter with a density of about 1.00 to 1.2 g/cc.

5. The batter article of claim 1 additionally comprising a chemical leavening system such as encapsulated sodium bicarbonate and leavening acid or acids.

6. The batter article of claim 1 wherein the inert gas is selected from the group consisting of nitrous oxide, carbon dioxide, nitrogen and mixtures thereof.

7. The batter article of claim 1 shelf stable at room temperature.

8. The batter article of claim 6 wherein the inert gas includes $N_2O$ at least a portion of which is dissolved into the batter.

9. The batter article of claim 1 wherein the batter has a density between 1.0 to 1.2 g/ml.

10. The batter article of claim 1 having a pH of about 6 to 8.5.

11. The batter article of claim 1 wherein the batter additionally comprises about 1 to 10% cocoa.

12. The batter article of claim 1 wherein the batter additionally comprises about 1% to 8% of a humectant.

13. The batter article of claim 3 wherein the batter additionally comprises about 0.01 to 2% Gellan gum.

14. The batter article of claim 12 wherein the humectant comprises glycerol or sorbitol or a mixture thereof.

15. The batter article of claim 13 wherein the batter additionally comprises about 5 to 200 ppm calcium ions.

16. The batter article of claim 1 wherein the batter additionally comprises about 1 to 5% eggs on a dry weight basis.

17. The batter article of claim 1 wherein the batter additionally comprises about 0.1 to 4% emulsifiers.

18. The batter article of claim 1 wherein the density of the product is between 1.1–1.35 g/cc when no gas is admixed with the batter.

19. The batter article of claim 6 having a pressure within the container of about 760 to 1,000 mmHg and additionally contain sodium, potassium sorbate, benzoate, propionic acid, calcium propionate, or parabens.

20. A method of fabricating a ready-to-bake brownie article, comprising:

providing an open sealable, gas impermeable container;

dispensing a brownie batter within at least a portion of the container, said brownies comprising:

about 25 to 70% sugar;
about 10 to 40% flour;
about 0 to 5% egg solid;
about 0.1 to 3% salt;
about 0 to 4% emulsifiers;
about 0 to 25% fat;
about 5 to 25% moisture;
said batter having a sugar to flour ratio of about 1.5:1 to 3.5:1, a water activity of less than 0.85, and a pH of about 6 to 8.5.

21. The method of claim 20 wherein the container is fabricated from a flexible material.

22. The method of claim 21 wherein the inert gas in the headspace has an oxygen content of less than 4%.

23. The method of claim 22 wherein the inert gas in the headspace is selected from the group consisting of nitrous oxide, carbon dioxide, nitrogen and mixtures thereof.

24. The method of claim 23 wherein the batter has an oxygen content of less than 1%.

25. The method of claim 20 wherein all the moisture is supplied by pasteurized eggs.

26. The method of claim 20 wherein the egg is added as dried eggs.

27. The method of claim 20 wherein water is added as part of an emulsion which in addition consists of emulsifiers, oil or melted shortening.

28. The method of claim 20 wherein all the emulsifiers are prehydrated before they are added to the brownie batter.

29. The method of claim 27 wherein part of the fat is liquid oil.

30. The method of claim 20 wherein part of the emulsifiers are prehydrated before they are added to the brownie batter.

31. The method of claim 20 wherein none of the emulsifiers are prehydrated before they are added to the brownie batter.

32. The method of claim 20 wherein none of the moisture is supplied by pasteurized eggs.

33. The method of claim 20 wherein part of the moisture is supplied by pasteurized eggs.

34. The method of claim 27 wherein all of the fat is liquid oil.

35. The method of claim 27 wherein none of the fat is liquid oil.

36. The method of claim 21 wherein the inert gas in the headspace has an oxygen content of less than 2%.

* * * * *